United States Patent [19]

Sakakibara

[11] Patent Number: 5,390,103
[45] Date of Patent: Feb. 14, 1995

[54] SYNCHRONIZED PROGRAMMABLE CONTROLLER AND METHOD OF CONTROLLING THE SAME

[75] Inventor: Masami Sakakibara, Nagoya, Japan

[73] Assignee: Mitsubishi Denki Kabushiki Kaisha, Tokyo, Japan

[21] Appl. No.: 144,609

[22] Filed: Nov. 1, 1993

Related U.S. Application Data

[63] Continuation of Ser. No. 763,590, Sep. 23, 1991, abandoned.

[30] Foreign Application Priority Data

Sep. 26, 1990 [JP] Japan ................... 2-255985

[51] Int. Cl.⁶ .................. G06F 15/46; G06F 13/14
[52] U.S. Cl. ..................... 364/131; 364/187; 364/DIG. 1; 364/230; 364/242.92; 364/271.2; 364/DIG. 2; 364/926.9; 364/931.48; 364/949; 371/9.1; 371/68.3; 395/550; 395/575
[58] Field of Search ............. 364/131–136, 364/187, 140–147, DIG. 1 MS File, DIG. 2 MS File; 371/9.1, 47.1, 68.1, 68.2, 68.3, 67.1; 395/200, 275, 325, 550, 575

[56] References Cited

U.S. PATENT DOCUMENTS

| 4,466,098 | 8/1984 | Southard ................ 371/9.1 |
| 4,495,569 | 1/1985 | Kagawa ................ 395/725 |
| 4,600,988 | 7/1986 | Tendulkar et al. ........... 364/131 X |
| 4,648,068 | 3/1987 | Ninnemann et al. .......... 364/136 X |
| 4,975,838 | 12/1990 | Mizuno et al. .......... 371/9.1 X |
| 5,010,476 | 4/1991 | Davis ............. 364/DIG. 1 X |
| 5,142,470 | 8/1992 | Bristow et al. ............ 364/187 X |

FOREIGN PATENT DOCUMENTS

| 0075278 | 3/1983 | European Pat. Off. . |
| 0081238 | 6/1983 | European Pat. Off. . |
| 3309418 | 12/1983 | Germany . |
| 3236302 | 4/1984 | Germany . |

Primary Examiner—Joseph Ruggiero
Attorney, Agent, or Firm—Rothwell, Figg, Ernst & Kurz

[57] ABSTRACT

A programmable controller for controlling line assembly machines includes first and second CPUs for cyclic execution of a user program stored in user memories. Execution cycles of one of the two CPUs are synchronized to those of the other by means of a synchronization signal such that simultaneous accesses to the input-/output bus do not take place. After booting, the second CPU is synchronized to the first. When the two CPUs enter into execution cycles of the user program, an abnormally functioning CPU is temporarily halted, and thereafter the execution cycles of such CPU is synchronized to those of the normally functioning CPU.

8 Claims, 11 Drawing Sheets

SYNCHRONIZED PROGRAMMABLE CONTROLLER AND METHOD OF CONTROLLING THE SAME

This is a continuation of application Ser. No. 07/763,590, filed Sep. 23. 1991, abandoned.

BACKGROUND OF THE INVENTION

This invention relates to programmable controllers for sequential controls of assembly lines, and methods of controlling the same.

FIG. 1 is a block diagram showing the organization of a conventional programmable controller. The programmable controller includes: a CPU 101; a ROM 103 for storing an operating system program, etc.; a work RAM 105 for storing temporary data; a user memory 107 for storing a user program for effecting a sequential control; a data RAM 109 for storing device information utilized in the user program; a buffer 111 for connecting the first interior bus 114 and the input/output bus 116; and input/output circuits 113 to which various controlled devices (not shown) are connected.

The operation of the programmable controller of FIG. 1 is as follows.

FIG. 2 is a flowchart showing the operation of the programmable controller of FIG. 1. The user program prepared by means of a programming device (not shown) is stored in the user memory 107 via an interface (not shown) for peripheral devices. Thus, when the power source (not shown) is turned on, the operating system stored in the ROM 103 starts to operate in accordance with the user program stored in the user memory 107.

Namely, the ON/OFF information of the limit switches etc. (not shown) coupled to the input/output circuits 113 are read out as the input information. The input information thus read out is stored as an input image in the data RAM 109. This is effected at the input refreshing step S1101.

Next, at step S1102, the operations indicated by the user program stored in the user memory 107 are executed successively by the CPU 101 in accordance with the input image stored in the data RAM 109. The results of operations executed by the CPU 101 are stored in the data RAM 109 as the output image information.

When the user program terminates, the count-up operations of the timers (not shown) and the counters (not shown) are executed as the end operations at step S1103. After these end operations are completed, the output image information stored in the data RAM 109 is written to the output portion of the input/output circuits 113 at the output refresh step S1104, such that the ON/OFF operations of the motors and solenoids coupled to the output portions of the input/output circuits 113 are controlled.

The above operations are executed repeatedly, such that the devices of the assembly lines, etc., are controlled by the programmable controller.

By the way, the input/output bus 116 to which the input/output circuits 113 are coupled are formed of external cables extending around in the environment, and hence are easily affected by the exterior environment. Thus, the accesses thereto must generally be slow. The conventional programmable controller thus has the disadvantage that the access speed to the input/output bus 116 is limited. This impairs the overall operation speed of the programmable controller.

SUMMARY OF THE INVENTION

It is therefore an object of this invention to provide a programmable controller and a method of controlling the same by which the overall operation speed can be enhanced in spite of the limited access speed to the input/output bus 116.

The above object is accomplished in accordance with the principle of this invention by a programmable controller for controlling operations of an object device by means of a cyclic execution of a user program, comprising: a user memory for storing a user program; first and second CPUs for independent cyclic executions of said user program; a data RAM for storing input and output information for said object device; first and second interior buses coupled to said first and second CPUs, respectively, for transferring information to and from the first and second CPUs, respectively; an input/output circuit for inputting and outputting data to and from the object device; an input/output bus connecting the input/output circuit to said first and second interior buses; and synchronization circuit for synchronizing operations of the first and second CPUs, wherein the operations of the first and second CPUs are synchronized in such a manner that accesses to said input/output bus from the first and second CPUs are effected in a time sharing mode.

Preferably, the synchronization circuit comprises: a first set value register which is set by the first CPU; a first comparator for comparing the value set in the first set value register with an address value within the user memory accessed by the first CPU, said first comparator generating a synchronization signal when the accessed address coincides with the value set in the first set value register; a second set value register which is set by the second CPU; and a second comparator for comparing the value set in the second set value register with an address value within the user memory accessed by the second CPU; said second comparator generating a synchronization signal when the accessed address coincides with the value set in the second set value register; where commencements of execution cycles of the user program via the first and second CPUs, respectively, are synchronized by means of the first and second synchronization signals, respectively.

Further, it is preferred that the programmable controller further comprises: first and second abnormality detection circuits for detecting abnormal operations of the first and second CPUs, respectively, wherein a CPU is temporarily halted upon detection of an abnormal operation thereof; disabling means for alternately disabling the first and second comparators, such that one of the first and second CPUs is synchronized to the other; wherein upon detection of an abnormality of one of the first and second CPUs, the comparator for generating a synchronization circuit for the abnormally operating CPU is disabled.

Each execution cycle of the user program preferably comprises the steps of: reading input data from said object device into said data RAM via the input/output circuit; performing calculations in accordance with the user program with respect to the input data stored in the data RAM; writing output data obtained by the calculations to the object device via the input/output circuit; wherein the steps of reading and writing data of the first CPU is effected when the second is performing calculations and the steps of reading and writing data of the second CPU is effected when the first is performing calculations.

Further, the programmable controller is preferred to be controlled by a procedure which includes the steps of: abling the first comparator and disabling the second comparator, such that the execution cycles of the user program by the second CPU are synchronized to those of the first CPU; determining, in each execution cycle of the user program of the first and second CPU, whether or not an abnormal operation has occurred; upon detection of an abnormal operation of either of the first and second CPU, halting the abnormal CPU, and disabling the comparator for generating the synchronization signal for other normal CPU and enabling the comparator for generating the synchronization signal for the abnormal CPU; resetting the abnormal CPU, such that the execution cycle of the CPU by the CPU an abnormal operation of which has been detected is synchronized to the normal CPU.

BRIEF DESCRIPTION OF THE DRAWINGS

The features which are believed to be characteristic of this invention are set forth with particularity in the appended claims. The structure and method of operation of this invention itself, however, will be best understood from the following detailed description, taken in conjunction with the accompanying drawings, in which:

In the drawings, like reference numerals represent like or corresponding parts or portions..

DETAILED DESCRIPTION OF THE PREFERRED EMBODIMENTS

Referring now to the accompanying drawings, the preferred embodiments of this invention are described.

Figure 1:
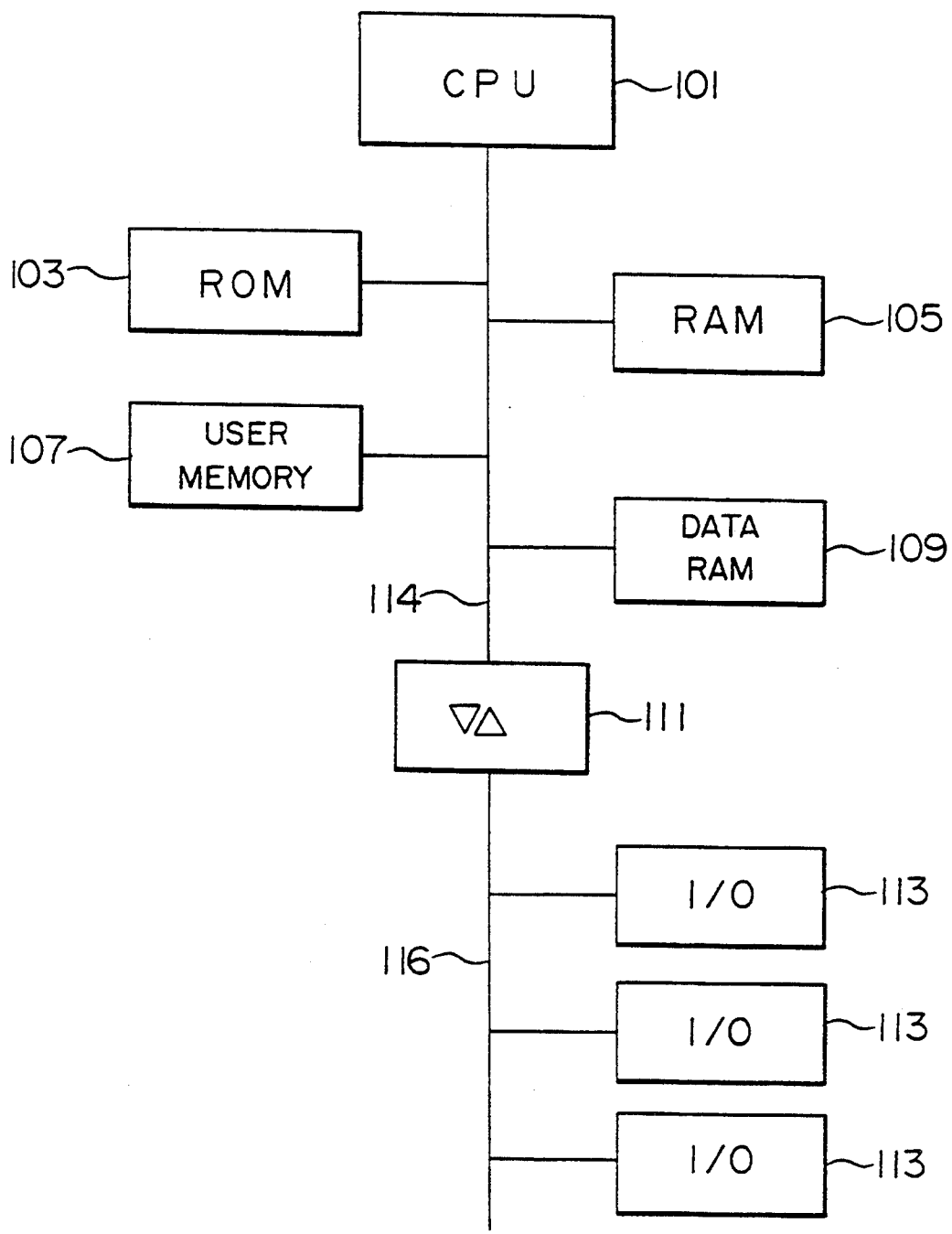
FIG. 1 is block diagram showing the organization of a conventional programmable controller.
Figure 2:
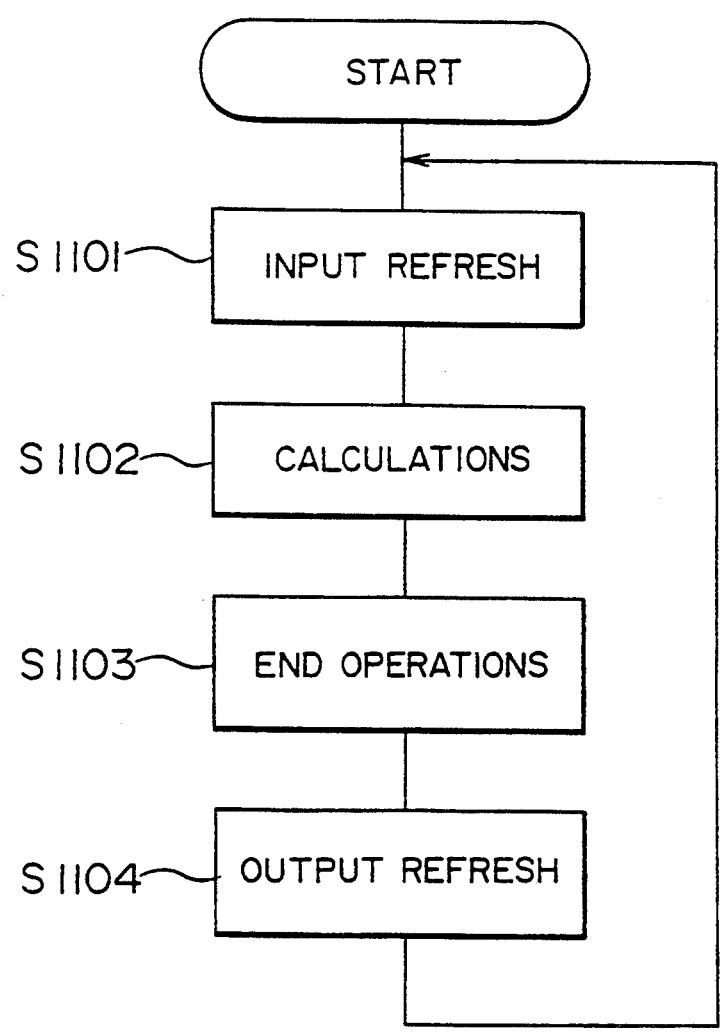
FIG. 2 is a flowchart showing the operation of the programmable controller of FIG. 1.
Figure 3:
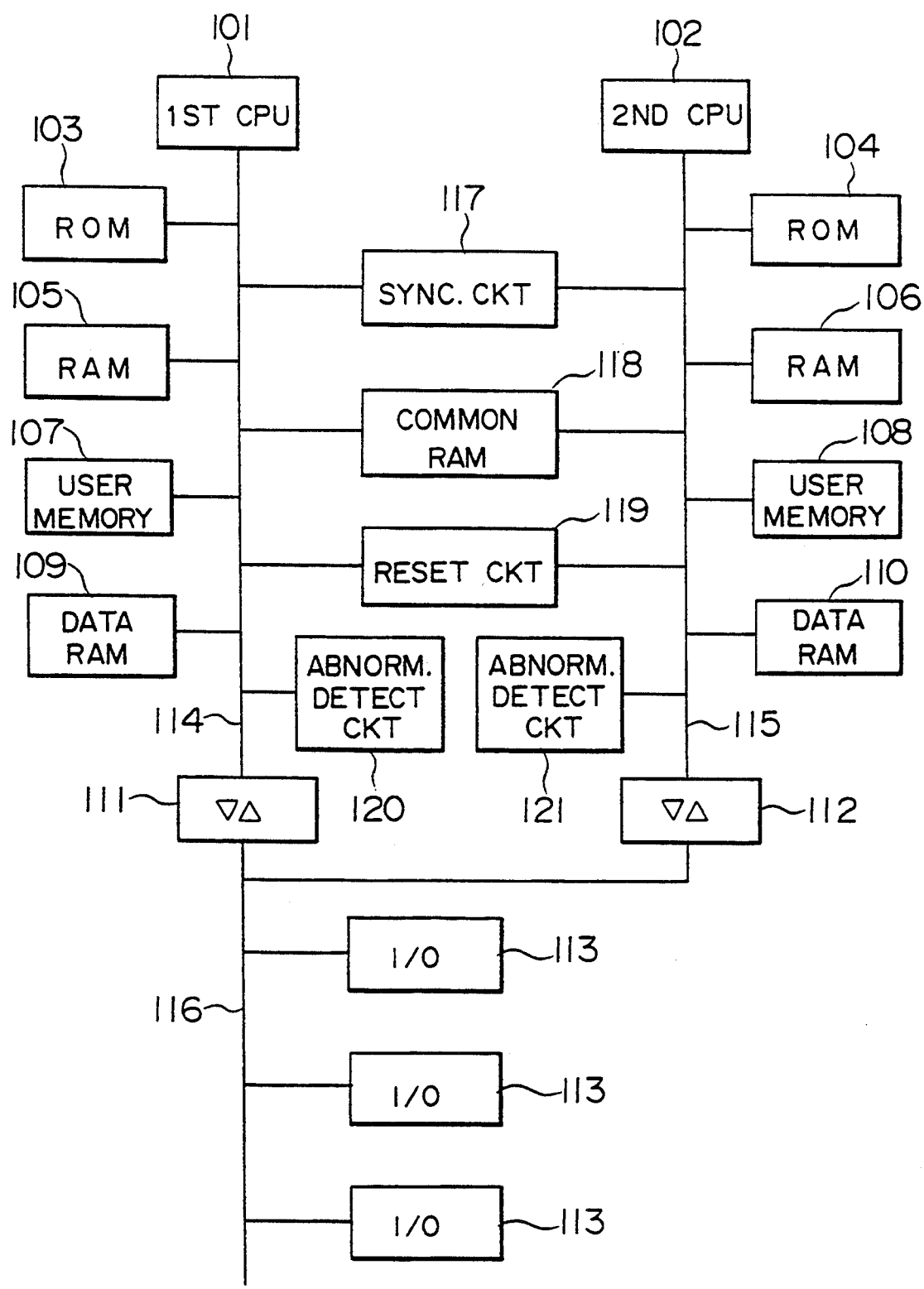
FIG. 3 is a block diagram showing the organization of a programmable controller according to this invention.

FIG. 3 is a block diagram showing the organization of a programmable controller according to this invention. The programmable controller of FIG. 3 has a duplicate control system and includes: first and second CPUs 101 and 102; first and second ROMs 103 and 104 for storing the respective operating systems for the first and second CPUs; first and second work RAMs 105 and 106 for the respective CPUs; first and second user memories 107 and 108 for storing user programs; first and second data RAMs 109 and 110 for storing input or output data from or to assembly line machines, etc., controlled by the programmable controller; buffers 111 and 112 for interfacing the respective interior buses 114 and 115 for the two CPUs to an input/output bus 116, to which the input/output circuits 113 for the controlled machines are connected.

The programmable controller further includes: a synchronization circuit 117 for synchronizing the operation timings of the two CPUs; a common RAM 118 for transferring data between the two CPUs; a reset circuit 119 for resetting either one of the CPUs after a halt; and first and second abnormality detection circuits 120 and 121 for detecting the abnormal operations of the respective CPUs 101 and 102. Upon detection of an abnormal operation of the associated CPU, the first abnormality detection circuit 120 or 121 halts the CPU in question, and the halted CPU is reset via the reset circuit 119 as described in detail below.

Figure 4:
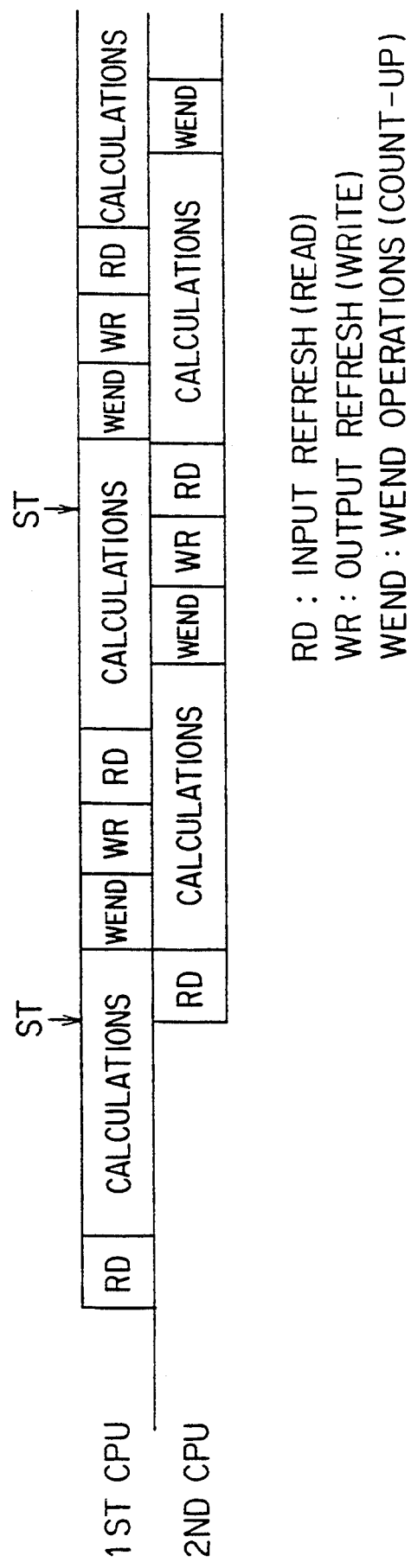
FIG. 4 is a timing chart showing the operation timings of the two CPUs of FIG. 3.
Figure 5:
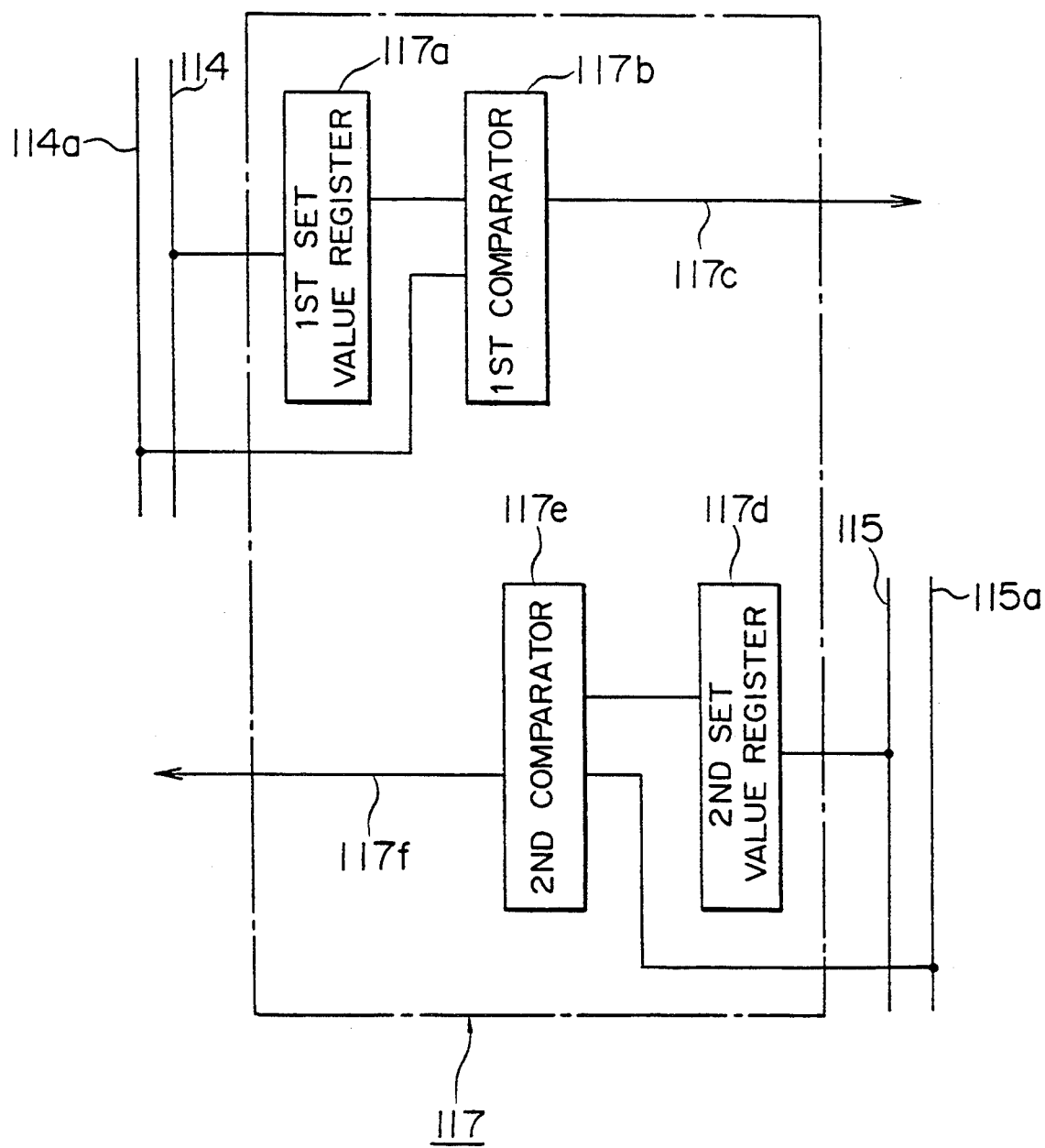
FIG. 5 is a block diagram showing an implementation of the synchronization circuit of FIG. 3.
Figure 6:
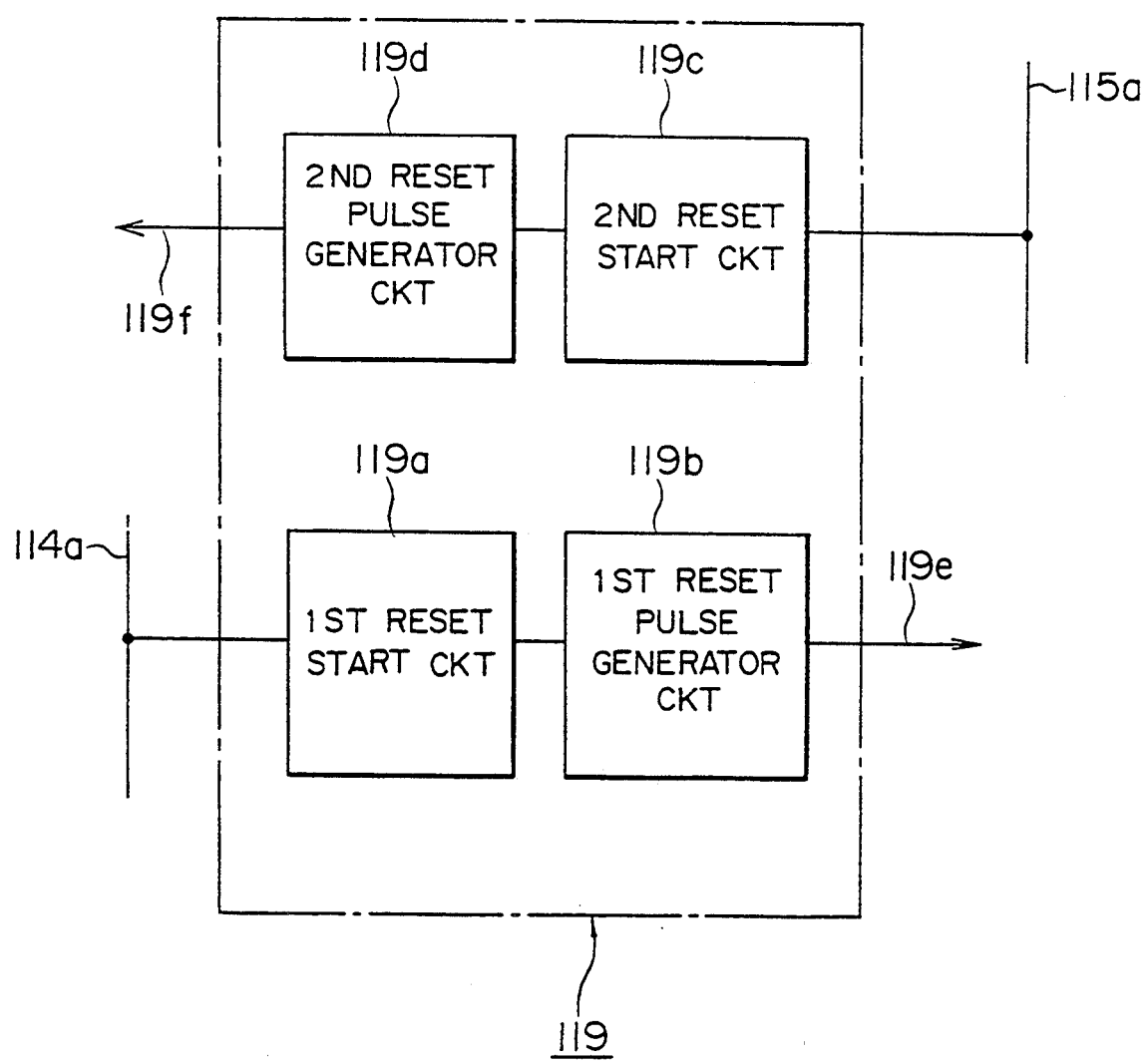
FIG. 6 is a block diagram showing an implementation of the reset circuit of FIG. 3.
Figure 7:
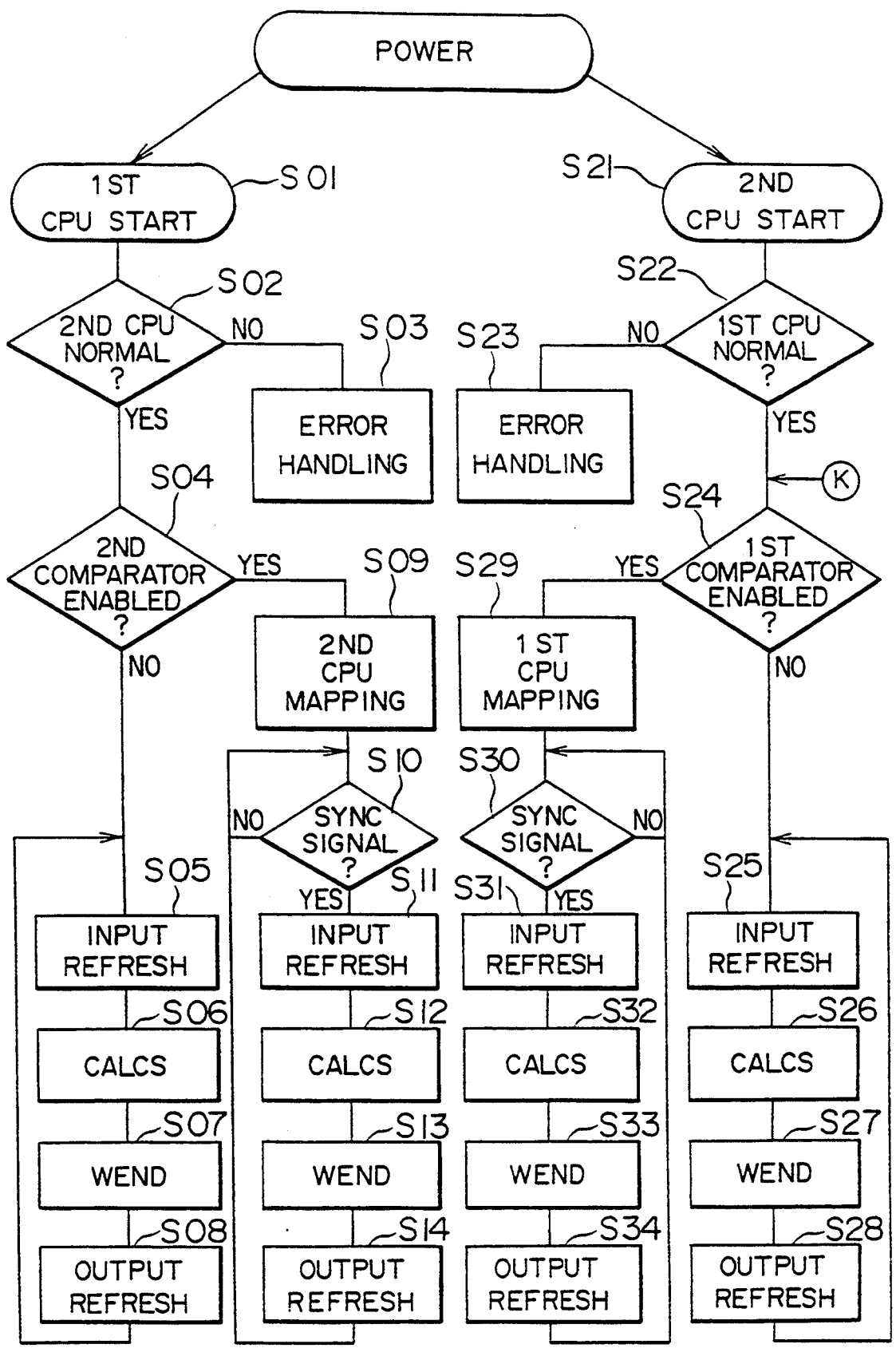
FIG. 7 is a flowchart showing the operation of the programmable controller of FIG. 3.

The overall method of operation of the programmable controller of FIG. 3 is described by reference to FIGS. 3 through 7. FIG. 4 is a timing chart showing the operation timings of the two CPUs of FIG. 3. FIG. 5 is a block diagram showing an implementation of the synchronization circuit of FIG. 3. FIG. 6 is a block diagram showing an implementation of the reset circuit of FIG. 3. FIG. 7 is a flowchart showing the operation of the programmable controller of FIG. 3.

Two identical user programs prepared by means of a programming device (not shown) are first stored in the first and second user memories 107 and 108, respectively. When the power source (not shown) of the programmable controller is turned on, the first and second operating systems stored in the first and second ROM 103 and ROM 104 begin operations at step S01 and step S21, respectively. Thus, the first and second CPU 101 and the CPU 102 are started.

When either of the first and second CPUs 101 and 102 are abnormal, the associated first abnormality detection circuit 120 or 121 detects it and halts the CPU in question. At step S02, the first CPU 101 judges whether or not the second CPU 102 is operating normally, and if the judgment is negative, it effects the error handling operations at step S03. Likewise, at step S22, the second CPU 102 judges whether or not the first CPU 101 is operating normally, and if the judgment is negative, it effects the error handling operations at step S23. The steps at step S02 and step S03 of the first CPU 101 or those at step S22 and step S23 of the second 102 are the same as those performed at WEND operations which are described in detail below.

At the start, the first comparator 117b of the synchronization circuit 117 (see FIG. 5) is enabled while the second comparator 117e is disabled, as described below. Thus, the first CPU 101 judges NO at step S04 and proceeds to the cyclic execution of the user program stored in the first user memory 107 at step S05 through step S08. On the other hand, since the first comparator 117b of the synchronization circuit 117 is enabled, the second CPU 102 judges YES at step S24 and after step S29 is placed in a wait state at step S30, and waits for synchronization signal 117c from the 117b. These operations are described in detail below.

As described above, the first CPU 101 enters into cyclic execution of the user program at step S05 through step S08. In the first execution cycle at step S06, it executes successively the instructions of the user program stored in the first user memory 107 in accordance with the instructions sequence, and when it accesses a preset address the value of which is stored in the synchronization circuit 117, the synchronization signal 117c of the synchronization circuit 117 generates a synchronization signal 117c to the second CPU 102, which is in the busy waiting loop at step S30, as described above.

Thus, at the first synchronization timing ST in FIG. 4, the second CPU 102 enters into the cyclic execution of the user program at step S31 through step S34. Thus, the second CPU 102 accesses the input/output bus 116 via the buffer 112 when the first CPU 101 is executing calculations at step S06.

In each execution cycle of the user program, the first CPU 101 executes WEND operations at step S07, where the counting-up operations (initializations) of the timers and counters, etc., are executed.

After the WEND operations are completed, the first CPU 101 accesses the input/output bus 116 via the buffer 111, and writes to the output portion of the input/output circuits 113 the results of calculations stored in the first data RAM 109, thereby completing the output refresh operations at step S08.

As shown in the timing chart of FIG. 4, the second CPU 102 is executing calculations when the first CPU 101 accesses the input/output bus 116. Since the second CPU 102 does not access the input/output bus 116 when the first CPU 101 accesses the input/output bus 116, simultaneous accesses from the two CPUs 101 and 102 to the input/output bus 116 never occurs.

After completing the output refresh operations at step S08, the first CPU 101 enters the second execution cycle of the user program and executes the input refresh operations (reading in the input information of the controlled machines via the 113) at step S05. At this phase, the second CPU 102 is still executing calculations at step S32, as shown in FIG. 4, such that only the first CPU 101 has access to the input/output bus 116. Thus, no simultaneous access from the two CPUs to the input/output bus 116 occur. The second CPU 102 enters into each execution cycle of the user program at step S31 through step S34 upon receiving a synchronization signal 117c from the first comparator 117b. The first and the second CPUs 101 and 102 thus make accesses to the input/output bus 116 in the time sharing mode.

Thus, initially, the first CPU 101 is predominant while the second CPU 102 is subservient in the synchronization of the operations. The operations continues in this manner until either of the two CPUs operates abnormally. However, when an abnormality of the first CPU 101 is detected, the second CPU 102 becomes predominant and the first CPU 101 subservient in the synchronization of operations. Namely, upon detection of an abnormality, the first CPU 101 is temporarily halted, and, after an error handing operations where the first comparator 117b is disabled and second comparator 117e enabled, the first CPU 101 is put in the busy waiting loop at step S10, such that it enters into each execution cycle at step S11 through step S14 upon receiving a synchronization signal 117f from the second comparator 117e of synchronization circuit 117. On the other hand, the second CPU 102 enters into the predominant execution cycle of the user program at step S25 through step S28. This is described in detail below.

The operations of the dual control system of the programmable controller is symmetrical with respect to the two CPUs, except that the first CPU 101 is predominant and the second CPU 102 subservient in the synchronization at the initialization. Each time an abnormality occurs in the predominant CPU, the subservient CPU become predominant and the previously predominant CPU subservient. FIG. 4 shows the timing where the first CPU 101 is predominant.

Next the organization and the method of operation of the synchronization circuit 117 are described in detail.

FIG. 5 is a block diagram showing an implementation of the synchronization circuit of FIG. 3. A first set value register 117a is coupled to the first interior bus 114 and is under control of the first CPU 101. A first comparator 117b coupled to the first interior bus 114 and the first address bus 114a for the first CPU 101 outputs its synchronization signal 117c to the second CPU 102, when the address value stored in the first set value register 117a coincides with the address accessed by the first CPU 101. Likewise, a second set value register 117d is coupled to second interior bus 115 and is under control of the second CPU 102. A second comparator 117e coupled to the second interior bus 115 and the second address bus 115a for the second CPU 102 outputs its synchronization signal 117f to the first CPU 101, when the address value stored in the second set value register 117d coincides with the address accessed by the second CPU 102.

The method of operation of the synchronization circuit 117 is as follows,

The first and second comparators 117b and 117e are initialized when the power of the programmable controller is turned on. In this initialization, the first comparator 117b is enabled, and the second comparator 117e is disabled. When the power is turned on, the first CPU 101 reads out the status of the second comparator 117e and judges NO at the enablement state judgment step S04 in FIG. 7. Thus the execution proceeds to the sequential operations at step S05 through step S08. On the other hand, the second CPU 102 reads out the status of the first comparator 117b and judges YES at the enablement state judgment step S24. Thus, the second CPU 102 judges YES at step S24 and, after step S29 described below, is synchronized at step S30 by the synchronization signal 117c from the first comparator 117b upon entering into each execution cycle of the user program at step S30 via step S29, as described below.

When, under this circumstance, the first CPU 101 executes the calculations to the first synchronization time point ST in FIG. 4 (at step S06 in FIG. 7), the value set in the first set value register 117a and the address then accessed by the first CPU 101 coincides. Thus, a synchronization signal 117c is output from the first comparator 117b, and in response thereto, the second CPU 102 enters into the input refresh step S31.

After this, the first and second CPUs 101 and 102 both repeat cyclically the operations at step S05 through step S08 and the operations at step S31 through step S34, respectively. Thus, the programmable controller keeps on executing the user program in synchronization such that the input/output bus 116 is accessed by the two CPUs in the time sharing mode.

The CPU mapping operation at step S29 is effected as follows. At the first CPU mapping step S29 the contents of the user memory 107 and the data RAM 109 under the control of the first CPU 101 are copied to the user memory 108 and the data RAM 110 under the control of the second CPU 102, respectively. This step, however, can be omitted when the second CPU 102 is booted normally at the time when the power is turned on. This memory map step S29, however, becomes necessary when the second CPU 102 falls into an abnormality due to some cause or other and then is reset to resume its normal operations. This is described in detail below.

The CPU mapping at step S09 is similar, except that the direction of copying (data transfer) is opposite.

The first comparator 117b is disabled and the second comparator 117e enabled when the operation of the first CPU 101 is abnormal. This is described in the case where the first CPU 101 is predominant (i.e., in the execution cycle at step S05 through step S08) and the second CPU 102 is subservient (i.e., in the execution cycle at step S30 through 34). It is to be noted that when the first CPU 101 is subservient and the second CPU 102 predominant, the f117e is disabled and the first comparator 117b enabled in a manner similar to that described below.

Figure 8:
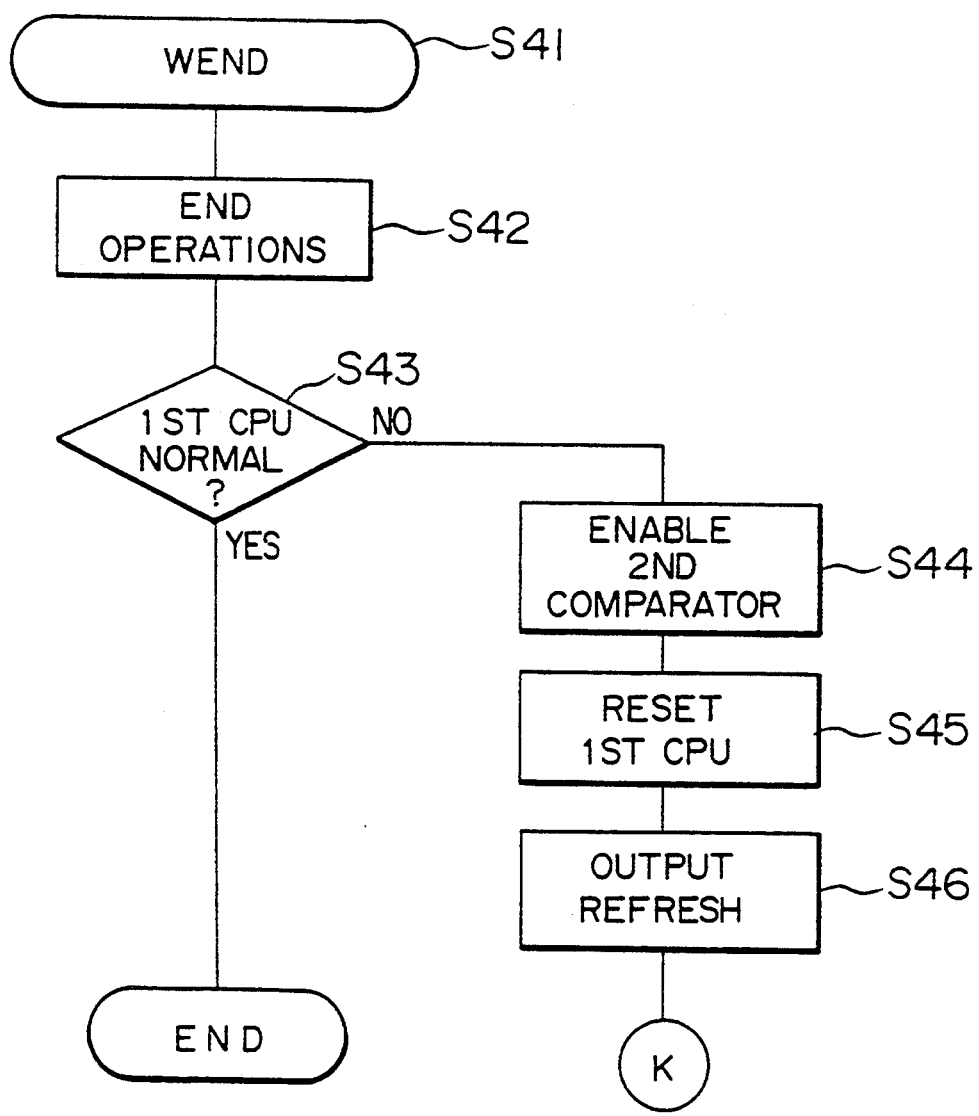
FIG. 8 is a flowchart showing the details of WEND operations of FIG. 7.

As shown in FIG. 8, the WEND operation at step S33 in FIG. 7 includes, after the end operations (counting up of timers, etc) at step S42, a judgment step S43 where it is judged whether or not the first CPU 101 is operating normally. This step S43 is the same as that at step S22 performed after the initialization. When the first CPU 101 is judged abnormal at step S43, the error handling operations similar to that at step S23 are executed. Namely, the second comparator 117e is enabled at step S44. The first CPU 101 is reset at the next step S45 as described below and the output refresh operations are effected at step S46. After the first CPU 101 disables the first comparator 117b, the execution proceeds to step S24 in FIG. 7, such that the first and second CPUs 101 and 102 changes their roles, and second CPU 102 now assumes the leading role (becomes predominant). Namely, the second CPU 102 enters the operations cycle at step S25 through step S28, while the first CPU 101 sits in the busy loop at step S10 and enters into each execution cycle at step S11 through step S14 after upon receiving the synchronization signal 117f from the second comparator 117e. Thus, the synchronization circuit 117 is capable of providing a bidirectional or symmetrical synchronization for the two CPUs.

The error handling operations at abnormalities are effected via the common RAM 118, the reset circuit 119, and the abnormality detection circuits 120 and 121.

Namely, when the first abnormality detection circuit 120 detects an abnormality of the first CPU 101, it generates a detection signal to the CPU 101. In response thereto, the first CPU 101 is halted, i.e., interrupts the execution of the user program, and disables the first comparator 117b of the synchronization circuit 117. The error handling upon an occurrence of abnormality of the second CPU 102 is effected in a similar manner.

As described above by reference to FIG. 8, whether or not an abnormality of the first CPU 101 has taken place (i.e., the operations of the first CPU 101 has been halted) is determined by the second CPU 102 in the error handling operations. In the case where the two CPUs are in the execution cycles of the user program and the first CPU 101 is predominant, an occurrence of abnormality is determined by the second CPU 102 at the WEND operation step S33 in FIG. 7. When an abnormality has occurred, the second comparator 117e is enabled at step S44 and the first CPU 101 is reset at the next step S45, as described above. This is effected via the reset circuit 119 as follows.

FIG. 6 is a block diagram showing an implementation of the reset circuit of FIG. 3. The reset circuit 119 includes: a first reset start circuit 119a coupled to the first address bus 114a first reset pulse generator circuit 119b for generating a reset signal 119e for resetting the second CPU 102; a second reset start circuit 119c coupled to the second address bus 115a; and a second reset pulse generator circuit 119d for generating a reset signal 119f for resetting the first CPU 101.

The second CPU 102 accesses the address of the second reset start circuit 119c of the reset circuit 119 via the second address bus 115a, and activates the second reset start circuit 119c. In response to the activation of the second reset start circuit 119c, the second reset pulse generator circuit 119d outputs a reset signal 119f which is input to the reset terminal of the first CPU 101. Thus, the first CPU 101 is forced to reset.

The reset signal 119f generated under this circumstance does not reset the first comparator 117b and the input/output circuits 113 which are under the control of the first CPU 101. Thus, the programmable controller continues to operate by means of the second CPU 102.

The reset signal 119f is a pulse signal, and the first CPU 101 is restarted via the operating system stored in the ROM 103.

Thus, under this circumstance, at step S02 in FIG. 7, the second CPU 102 is judged normal, and the second comparator 117e is in the enabled state at step S04. The first CPU 101 thus judges YES at step S02 and step S04, executes the second CPU mapping at step S09.

The reason for effecting second CPU mapping at step S09 is as follows. When rebooted, the first CPU 101 should be started in the same state as the second CPU 102 which continues operations during the time when the first CPU 101 is halted.

Thus, the contents of the user memory 108 and the data RAM 110 under the control of the second CPU 102 are mapped (i.e., copied) to the user memory 107 and the data RAM 109, respectively, via the common RAM 118

After the step S45 in FIG. 8, the second CPU 102 executes the output refresh operations at step S46, and jumps to step S24 in FIG. 7. Since the first comparator 117b is disabled at step S24, the second CPU 102 proceeds to the input refresh operation at step S25, to keep on executing the user program as the predominant CPU at steps S25 through S28.

The memory mapping from the CPU 102 to the memories of the first CPU 101 at step S09 is effected at the first WEND operation at step S27 by the second CPU 102. Thus, the synchronization signal 117f generated at the first execution cycle of the user program is ignored.

When the memory mapping is completed, the second CPU 102 executes the output refresh at step S28, to repeat the execution of the user program at step S25 through step S28. The mapping is not effected at the WEND operation step S27 in the second and later execution cycles and normal execution cycles are repeated.

When the mapping at step S09 is over, the first CPU 101 waits for the synchronization signal 117f in the busy loop at the step S10, and in response to the synchronization signal 117f, the first CPU 101 starts the input refresh operations at step S11 in synchronization with the synchronization signal 117f. The first CPU 101 thus enters into subservient execution cycles of the user program at step S10 through step S14.

When, under this circumstance, the operations of the second CPU 102 becomes abnormal, the first CPU 101 again assumes the leading role (i.e., predominant) in stead of the second CPU 102 in a manner similar to that described above.

Thus, the procedure of FIG. 7 is symmetrical with respect to the two CPUs except that the first CPU 101 is predominant upon initialization. The WEND operation operations at step S07, step S13, and step S27 are thus similar to that at step S33 described above.

The above embodiment is capable of various modifications.

Figure 9:
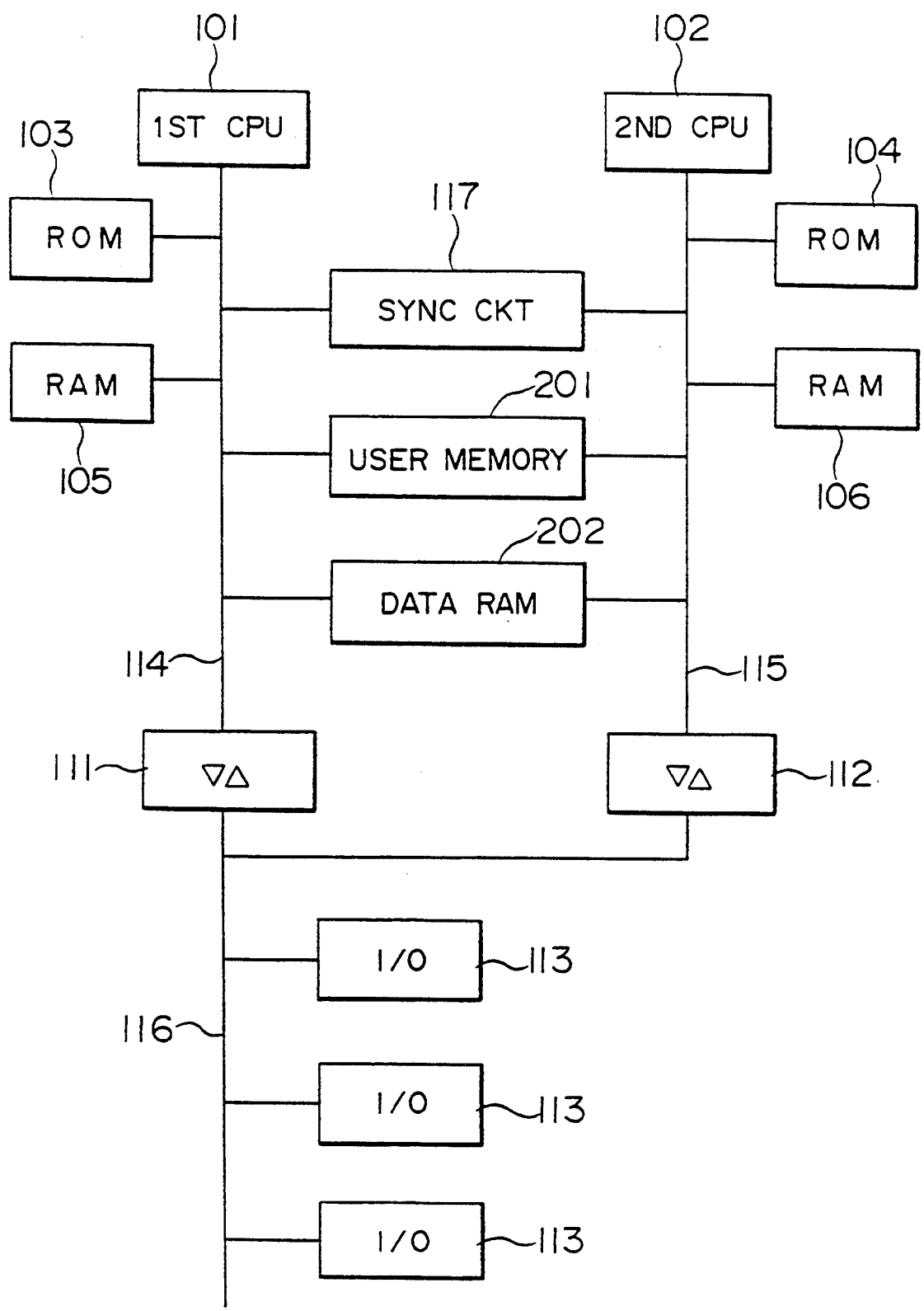
FIG. 9 is a block diagram showing the organization of another programmable controller according to this invention.

FIG. 9 is a block diagram showing the organization of another programmable controller according to this invention. In the case of the programmable controller of FIG. 9, a common user memory (RAM) 201 and a common data RAM 202 are accessible from both the first and second CPUs 101 and 102. In the case of this configuration, the common RAM 118 can be omitted.

Figure 10:
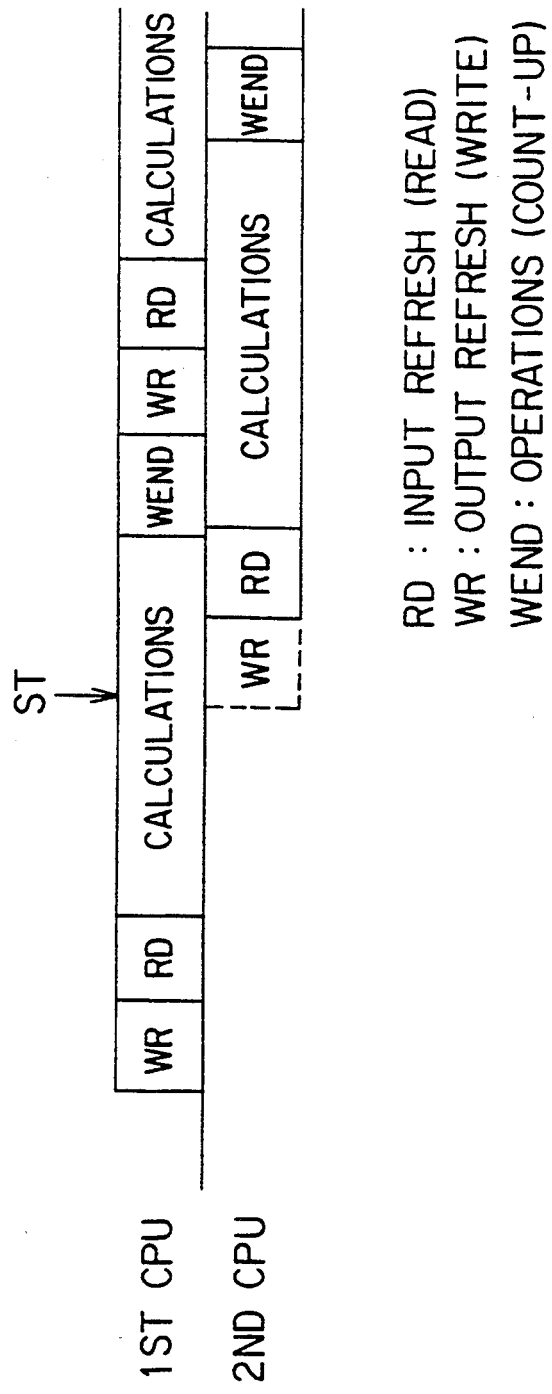
FIG. 10 is a timing chart showing modified operation timings of the two CPUs according to this invention.

FIG. 10 is a timing chart showing modified operation timings of the two CPUs according to this invention. In the case of FIGS. 4 and 7, the input refresh operation (reading in the information with respect to the controlled machines) is executed at the beginning of each execution cycle of the user program. However, as shown in FIG. 10, the output refresh operation (writing out the data in the common data RAM to the input/output circuits 113) may be executed at the beginning for the purpose of initializing the output circuits. This first output refresh for the purpose of initializing the output circuits may be limited to the first CPU 101, and the initialization via the second CPU 102 may be omitted, since the output circuits are already initialized at the timing.

Further, in the above embodiment, the synchronization signal 117c is generated at the synchronization time point ST in FIG. 4. However, the synchronization signal 117c may be generated immediately after the input refresh of the first CPU 101, such that the input refresh operation of second CPU 102 follows immediately after the input refresh of the first CPU 101 is completed.

Figure 11:
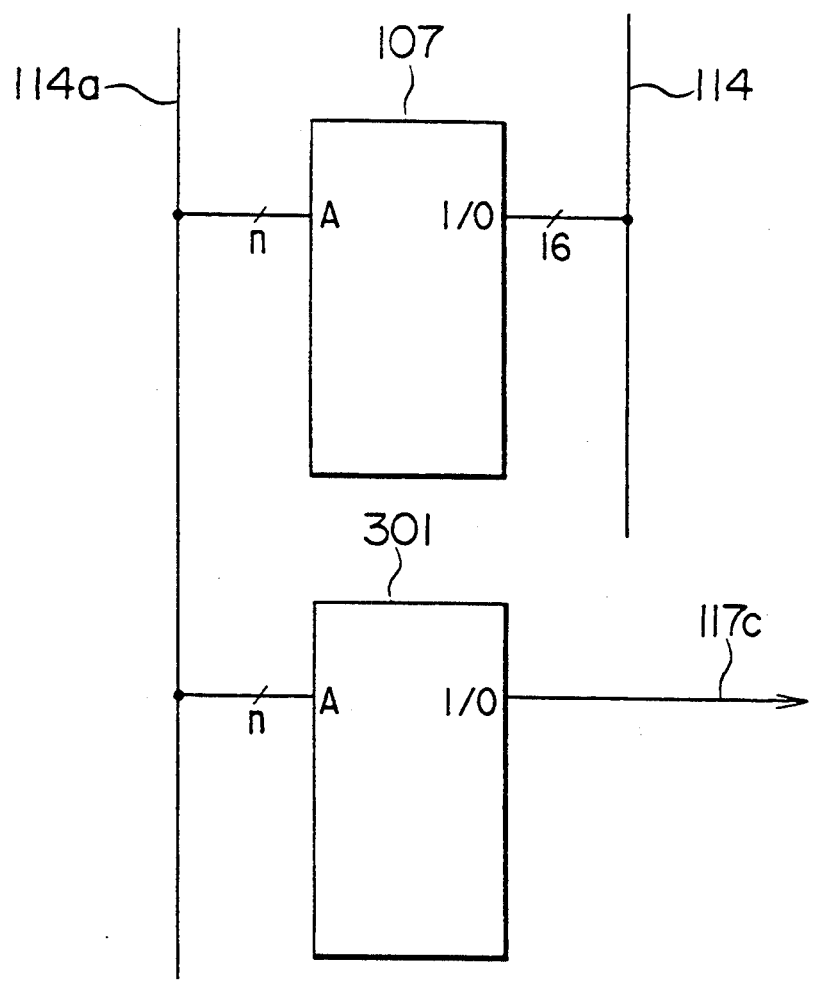
FIG. 11 is a block diagram showing an alternative implementation of the synchronization circuit.

Furthermore, the implementation of the synchronization circuit 117 is not limited to that of FIG. 5. The function of the synchronization circuit 117 may be incorporated in the user memory 107. Namely, supposing that the instructions of the user program consist of 16 bits words, one bit may be reserved for synchronization, the substance of instructions being constituted by the remaining 15 bits. Alternatively, a 1-bit RAM 301 as shown in FIG. 11 may be provided for the purpose of generating the synchronization signal 117c for the second CPU 102. In this case, another 1-bit RAM (not shown) for generating the synchronization signal 117f for the first CPU 101 must also be provided.

Furthermore, in the above embodiment, either the first comparator 117b or the second comparator 117e is disabled as described by reference to FIG. 7. However, both the first comparator 117b and the second comparator 117e may always be in the abled state, and the processing of the synchronization signal 117f and 117c by the first and second CPUs 101 and 102, respectively, is disabled in the periods during which the first comparator 117b and the second comparator 117e are disabled, respectively. Namely, in the case where, for example, the processings of the synchronization signal 117f and 117c by the first and second CPUs 101 and 102 are triggered via an interrupt, the CPUs may be masked against the interrupt during the relevant periods.

Further, when the programmable controller is organized as shown in FIG. 9, where the common user memory (RAM) 201 and the common data RAM 202 are accessible both from the first and second CPUs 101 and 102, the memory mapping at step S09, etc., becomes unnecessary, since the same RAM can be accessed from both CPUs.

In addition, in the case of the above embodiment, the memory mapping at step S09, etc., is effected simultaneously for the common user memory (RAM) and the common data RAM. If this operation is too slow and time-consuming such that it gives rise problems to the system control, then the common user memory (RAM) may be copied beforehand and only the common data RAM may be copied at the step S09.

Furthermore, in the case of the above embodiment, the reset circuit 119 is used for restarting the CPU which has undergone an abnormality. However, when a CPU stops upon detection of an abnormality, it may output a resetting pulse to restart itself.

Thus, the programmable controller of this invention is applicable to a wide range of application fields other than for controlling line assembly machines. For example, it can be applied with advantage to numerical control devices, etc.

What is claimed is:

1. A method of controlling a programmable controller, wherein said controller includes a first and second CPU for independent cyclic execution of a user program, a user memory, a first comparator for comprising a value set in a first set value register with an address value within the user memory accessed by the first CPU, a second comparator for comprising a value set in a second set value register with an address value within the user memory accessed by the second CPU, comprising, after booting of the CPUs, the steps of:
   enabling the first comparator and disabling the second comparator, such that the execution cycles of the user program by the second CPU are synchronized to those of the first CPU;
   determining, in each execution cycle of the user program of the first and second CPU, whether or not an abnormal operation has occurred;
   upon detection of an abnormal operation of either of the first and second CPU, halting the abnormal CPU, and disabling the comparator for generating the synchronization signal for other normal CPU and enabling the comparator for generating the synchronization signal for the abnormal CPU;
   resetting the abnormal CPU, such that the execution cycle of the CPU by the CPU an abnormal operation of which has been detected is synchronized to the normal CPU.

2. A programmable controller for controlling operation of an object device by cyclic execution of a user program, comprising:
   a user memory for storing a user program;
   first and second CPUs for performing independent cyclic executions of said user program;
   a data RAM for storing input and output information for said object device;
   first and second interior buses coupled to said first and second CPUs, respectively, for transferring information between said first and second CPUs and said user memory and data RAM, respectively;
   an input/output circuit for inputting and outputting data to and from said object device;
   an input/output bus connecting said input/output circuit to said first and second interior buses; and
   a synchronization circuit coupled to said first and second interior buses and detecting signals thereon for controlling the timing of said independent cyclic executions of said user program by said first and second CPUs by providing a synchronization signal to one of said first and second CPUs in response to the execution of a predetermined instruction of said user program by the other of said first and second CPUs as indicated by detection of a predetermined signal on a respective one of said first and second interior buses, so as to prevent simultaneous accesses to said input/output bus from the first and second CPUs.

3. A programmable controller as claimed in claim 2, wherein said programmable controller comprises:
   first and second user memories for storing the user program; and
   first and second data RAMs for storing input and output information for said object device; said first and second interior buses connecting the first and second user memories and data RAMs to the first and second CPUs, respectively.

4. A programmable controller as claimed in claim 2, wherein said synchronization circuit comprises:
   a first set value register which is set by the first CPU;
   a first comparator for comparing the value set in the first set value register with an address value within the user memory accessed by the first CPU, said first comparator generating a synchronization signal when the accessed address coincides with the value set in the first set value register;
   a second set value register which is set by the second CPU; and
   a second comparator for comparing the value set in the second set value register with an address value within the user memory accessed by the second CPU; said second comparator generating a synchronization signal when the accessed address coincides with the value set in the second set value register;
   where commencements of execution cycles of the user program via the first and second CPUs, respectively, are synchronized by means of the first and second synchronization signals, respectively.

5. A programmable controller as claimed in claim 4, further comprising:
   first and second abnormality detection circuits for detecting abnormal operations of the first and second CPUs, respectively, wherein a CPU is temporarily halted upon detection of an abnormal operation thereof;
   disabling means for alternately disabling the first and second comparators, such that one of the first and second CPUs is synchronized to the other;
   wherein upon detection of an abnormality of one of the first and second CPUs, the comparator for generating a synchronization circuit for the abnormally operating CPU is disabled.

6. A programmable controller as claimed in claim 5, further comprising:
   reset means for resetting and restarting a CPU which has been halted, upon detection of an abnormal operation.

7. A method of operating a programmable controller for controlling operation of an object device, wherein said controller includes a first and a second CPU for performing independent cyclic executions of a user program, wherein each execution cycle of said user program includes execution of reading operations for reading information from said object device, writing operations for writing information to said object device, and calculation operations for performing arithmetic operations on data, said method comprising the step of:
   controlling the timing of said independent cyclic executions of said user program by said first and second CPUs to cause reading and writing operations to be executed by one of said first and second CPUs simultaneously with the execution of calculation operations by the other of said CPUs by detecting execution of a predetermined instruction of said user program by one of said first and second CPUs and providing a synchronization signal to the other of said first and second CPUs in response to said detection.

8. A method of operating a programmable controller according to claim 7, wherein said step of detecting comprises the step of detecting the execution of a predetermined user program instruction by one of said CPUs by comparing an instruction address issued by said one CPU with a stored predetermined instruction address, and said step of providing comprises the step of transmitting a synchronization signal to the other of said CPUs in response to such detection, said synchronization signal causing said other of said CPUs to begin a cyclic execution.

* * * * *